(12) United States Patent
Dhavale et al.

(10) Patent No.: US 8,850,132 B1
(45) Date of Patent: Sep. 30, 2014

(54) METHOD AND SYSTEM FOR PROVIDING A SHARED DATA RESOURCE COORDINATOR WITHIN A STORAGE VIRTUALIZING DATA PROCESSING SYSTEM

(75) Inventors: Poonam P. Dhavale, Sunnyvale, CA (US); Kalaivani Arumugham, Sunnyvale, CA (US); Randall K. Shingai, San Jose, CA (US); Ronald S. Karr, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 177 days.

(21) Appl. No.: 11/007,605

(22) Filed: Dec. 8, 2004

(51) Int. Cl.
*G06F 12/00* (2006.01)
*G06F 13/00* (2006.01)
*G06F 13/28* (2006.01)

(52) U.S. Cl.
USPC ............... 711/154; 711/147; 711/E12.001; 711/E12.103

(58) Field of Classification Search
None
See application file for complete search history.

(56) References Cited

U.S. PATENT DOCUMENTS

| | | | |
|---|---|---|---|
| 6,163,855 A * | 12/2000 | Shrivastava et al. | 714/4.4 |
| 6,185,663 B1 * | 2/2001 | Burke | 711/156 |
| 6,341,340 B1 * | 1/2002 | Tsukerman et al. | 711/150 |
| 6,356,978 B1 * | 3/2002 | Kobayashi et al. | 711/113 |
| 6,449,734 B1 * | 9/2002 | Shrivastava et al. | 714/15 |
| 7,069,295 B2 * | 6/2006 | Sutherland et al. | 709/203 |
| 2003/0167423 A1 * | 9/2003 | Murakami et al. | 714/38 |
| 2003/0172069 A1 * | 9/2003 | Uchiyama et al. | 707/9 |
| 2003/0177150 A1 * | 9/2003 | Fung et al. | 707/204 |
| 2003/0236945 A1 * | 12/2003 | Nahum | 711/114 |
| 2004/0049573 A1 * | 3/2004 | Olmstead et al. | 709/224 |
| 2004/0123029 A1 * | 6/2004 | Dalal et al. | 711/114 |
| 2004/0123030 A1 * | 6/2004 | Dalal et al. | 711/114 |
| 2004/0123062 A1 * | 6/2004 | Dalal et al. | 711/170 |
| 2004/0123063 A1 * | 6/2004 | Dalal et al. | 711/170 |
| 2004/0153740 A1 * | 8/2004 | Fujimoto | 714/7 |
| 2004/0250113 A1 * | 12/2004 | Beck | 713/201 |
| 2005/0015384 A1 * | 1/2005 | Wehrman et al. | 707/100 |
| 2005/0015657 A1 * | 1/2005 | Sugiura et al. | 714/6 |
| 2005/0149684 A1 * | 7/2005 | Sankaran et al. | 711/162 |
| 2006/0085425 A1 * | 4/2006 | Lauer et al. | 707/10 |

OTHER PUBLICATIONS http://web.archive.org/web/20001213083300/centered.com/products.html, Centered Systems Second Copy 2000, Dec. 13, 2000, pp. 1-2.*

* cited by examiner

*Primary Examiner* — Edward Dudek, Jr.
*Assistant Examiner* — Matthew Chrzanowski
(74) *Attorney, Agent, or Firm* — Campbell Stephenson LLP (57) ABSTRACT

A method and system for providing a shared data resource coordinator within a storage virtualizing data processing system is disclosed. According to one embodiment of the present invention, a first node of a plurality of nodes is configured to process requests to access a shared data resource on behalf of the plurality of nodes, where the plurality of nodes includes a logical volume configuration server configured to present a logical volume to one or more logical volume configuration clients. A second node is then selected from the plurality of nodes and configured to process requests to access the shared data resource on behalf of the plurality of nodes.

12 Claims, 6 Drawing Sheets

METHOD AND SYSTEM FOR PROVIDING A SHARED DATA RESOURCE COORDINATOR WITHIN A STORAGE VIRTUALIZING DATA PROCESSING SYSTEM

BACKGROUND

1. Technical Field

The present invention relates to data storage and retrieval generally and more particularly to a method and system for providing a shared data resource coordinator within a storage virtualizing data processing system.

2. Description of the Related Art

Information drives business. Companies today rely to an unprecedented extent on online, frequently accessed, constantly changing data to run their businesses. One system for the storage, management, and retrieval of such data is the storage area network (SAN). A storage area network (SAN) is a high-speed special-purpose network (or subnetwork) that interconnects one or more physical data storage devices with one or more associated server and/or client data processing systems. Typically, a storage area network is part of the overall network of computing resources for an enterprise and may include a number of physical storage devices, hubs, switches, bridges, server data processing systems, backup devices, and interface cards or host bus adapters communicatively interconnected using various communication protocols (e.g., SCSI, Fibre Channel, or the like). SANs frequently support disk mirroring, backup and restore, archival and retrieval of archived data, data migration from one storage device to another, and the sharing of data among different servers in a network. SANs can incorporate subnetworks with network-attached storage (NAS) systems.

One technique increasingly implemented with storage area networks is storage virtualization. Using storage virtualization, physical storage objects may be flexibly used to present one or more logical storage objects (e.g., volumes) on a storage area network. For example, a single physical storage device may be virtually partitioned into multiple logical storage objects or combined with other physical storage devices to present a single logical storage object. Logical storage objects (e.g., volumes) may be presented as, and behave like, physical block storage devices (e.g., physical disk storage devices), but may have arbitrarily complex (e.g., possibly redundant) internal geometries. The memory space of a logical storage object is ultimately mapped to a memory space on one or more physical storage devices, or to the memory space of one or more other logical storage objects. Storage virtualization enables tasks such as backup, archiving, and recovery to be performed more easily, and in less time, by disguising the actual complexity of the SAN and storage devices of various types. Consequently, a wide variety of physical storage devices may be used to store data within an enterprise without regard to server or client platform or physical storage device configuration. Storage virtualization may be implemented at different levels (e.g., logical volume configuration client or server data processing systems within or outside of the SAN, SAN nodes such as switches, hubs, bridges, or the like, and/or physical storage devices or appliances) within an enterprise at a hardware, firmware, or software level. Storage virtualization may also be provided alternatively "in-band" (symmetrically) or "out-of-band" (asymmetrically).

In "in-band" storage virtualization, the element which "virtualizes" storage by mapping logical volume memory addresses to physical device memory addresses is located at least logically or functionally within the input/output (I/O) or "data" path such that it translates or maps each application-generated logical address into a physical address. An "in-band" storage virtualization element is therefore functionally interposed between the physical storage device or devices which make up a logical storage object and the data processing system(s) which are associated with the application or applications mounting the logical storage object. In "out-of-band" virtualization by contrast, the element or elements responsible for virtualizing storage resides outside of the data or "I/O" path, providing metadata (e.g., the mapping between logical and physical device addresses) to application data processing system(s) which in turn map I/O operations.

In conventional data processing system employing storage virtualization, the element or elements responsible for virtualization also perform a number of other storage related functions. For example, where a logical volume is to be shared among a number of logical volume configuration clients (i.e., configured to be accessed by two or more logical volume configuration clients), access to the shared logical volume itself, or metadata associated with the shared logical volume is to be coordinated among all logical volume configuration clients by the element or elements providing the core storage virtualization functionality, thus resulting in additional latency and reduced reliability.

SUMMARY

Disclosed is a method and system for providing a shared data resource coordinator within a storage virtualizing data processing system. According to one embodiment of the present invention, a first node of a plurality of nodes is configured to process requests to access a shared data resource on behalf of the plurality of nodes, where the plurality of nodes includes a logical volume configuration server configured to present a logical volume to a logical volume configuration client. A second node is then selected from the plurality of nodes (e.g., where the first node has become incapable of acting as the coordinator for any reason) and configured to process requests to access the shared data resource on behalf of the plurality of nodes. Embodiments of the present invention may be used to distribute the workload associated with providing storage virtualization and related functionality such as logical volume mirroring and synchronization, shared logical volumes, and the like.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Figure 1:
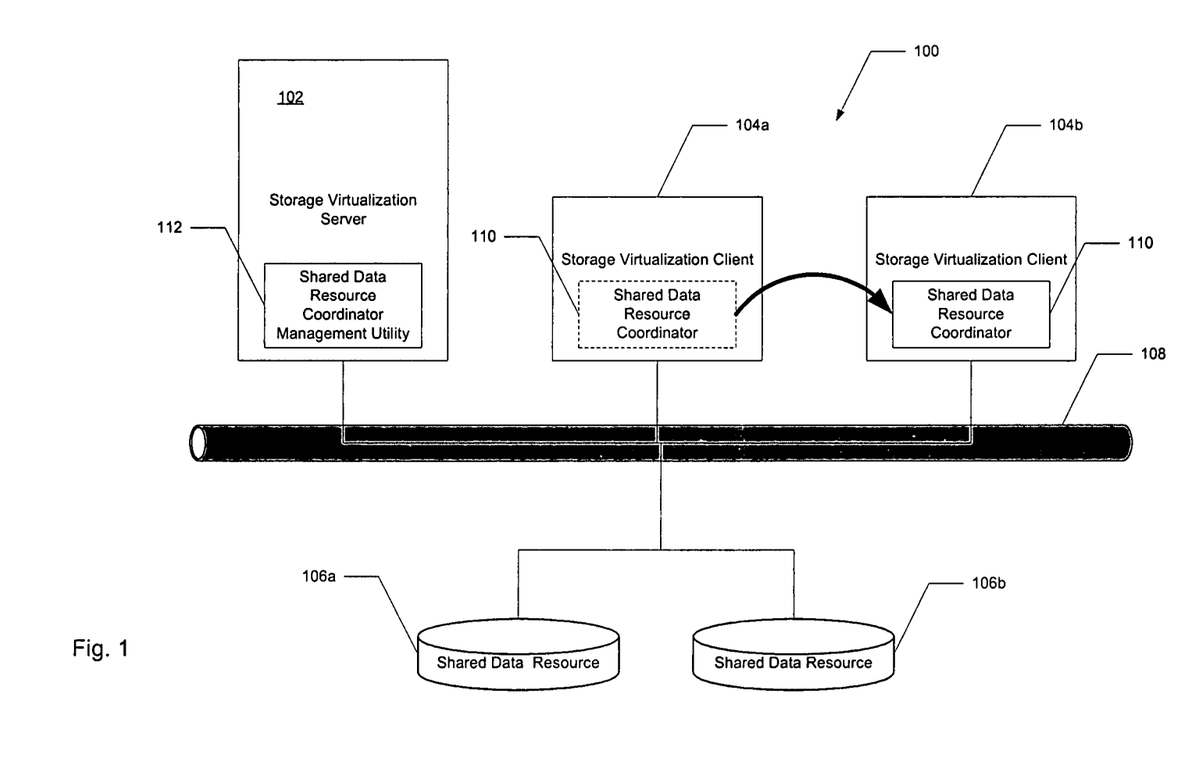
FIG. 1 illustrates a data processing system employing storage virtualization according to an embodiment of the present invention.

FIG. 1 illustrates a data processing system 100 employing storage virtualization according to an embodiment of the present invention. Data processing system 100 of the illustrated embodiment includes a storage virtualization server 102, a first storage virtualization client 104a and a second storage virtualization client 104b, all coupled to one another and to a first shared data resource 106a and a second shared data resource 106b via a storage area network 108 as shown. While only two storage virtualization clients have been illustrated in the depicted embodiment of FIG. 1, in alternative embodiments of the present invention additional storage virtualization clients or other nodes or elements may be coupled to storage area network 108.

Data processing applications run on storage virtualization client data processing systems. Each storage virtualization client obtains configuration information for associated logical volumes and/or the right to access (e.g., perform I/O on) such logical volumes from storage virtualization server 102. The configuration information indicates where the logical volume resides (which disks and locations on those disks) and how it is laid out. Storage virtualization server 102 is used to perform volume reconfiguration operations initiated by an administrator or an I/O error. In such cases, storage virtualization server 102 revokes rights it delegated to a storage virtualization client and then reconfigures the volumes. After the reconfiguration is complete, storage virtualization server 102 may re-delegate access rights to one or more storage virtualization clients. By delegating the right to access a logical volume, storage virtualization server 102 enables any node (e.g., storage virtualization clients 104a and 104b) on SAN 108 to "mount" or access the logical volume. Furthermore, storage virtualization server 102 may delegate access rights to a set of nodes on SAN 108 concurrently. Consequently, all nodes in the set can share access to and perform I/O on the logical volume at substantially the same time.

According to one embodiment, shared data resource 106a is a shared logical volume and shared data resource 106b is a logical volume storing metadata (e.g., data indicating which regions of the shared logical volume have been previously updated and may require synchronization following a mirror storage element write failure or snapshot/detached mirror reattach operation). In the illustrated embodiment of FIG. 1, a shared data resource coordinator 110 is initially assigned to or configured on first storage virtualization client 104a and subsequently transferred to or configured on second storage virtualization client 104b as shown. A shared data resource coordinator such as shared data resource coordinator 110 may be transferred based upon any of a number of conditions, (e.g., where the first storage virtualization client 104a becomes unable to perform one or more functions required by shared data resource coordinator 110, where second storage virtualization client 104b is recognized as a more appropriate host for the functionality of shared data resource coordinator 110, where functionality is to be distributed to one or more storage virtualization client for load balancing or fault tolerance purposes, or the like).

Within the illustrated embodiment of FIG. 1, shared data resource coordinator 110 is used to coordinate access to each of the shared data resources 106 and 106b. In an alternative embodiment, shared data resource coordinator 110 may similarly be used to coordinate access to a shared data resource using a so-called lease technique. Using a lease technique, updates to a shared data resource to be shared among a group of nodes or users are distributed to each member of the group substantially simultaneously. Each node or user of the group requests a lease (e.g., a specialized token or the like) from shared data resource coordinator 110. Once a lease has been granted, shared data resource coordinator 110 distributes any update to the shared data resource for which the lease was requested to each node or user which holds a lease at substantially the same time.

In the depicted embodiment, configuration and transfer of shared data resource coordinator 110 is managed by shared data resource coordinator management utility 112 within storage virtualization server 102. In alternative embodiments of the present invention, one or more separate nodes (not illustrated) within data processing system 100 may be utilized for the management, configuration, and/or transfer of shared data resource coordinator 110. Similarly, shared data resource coordinator 110 may be assigned or configured on one or more nodes not associated with shared data resources 106a and 106b and multiple shared data resource coordinators may be configured or assigned to coordinate operations on separate portions or regions of a given shared data resource (e.g., of a single shared logical volume).

Figure 2A:
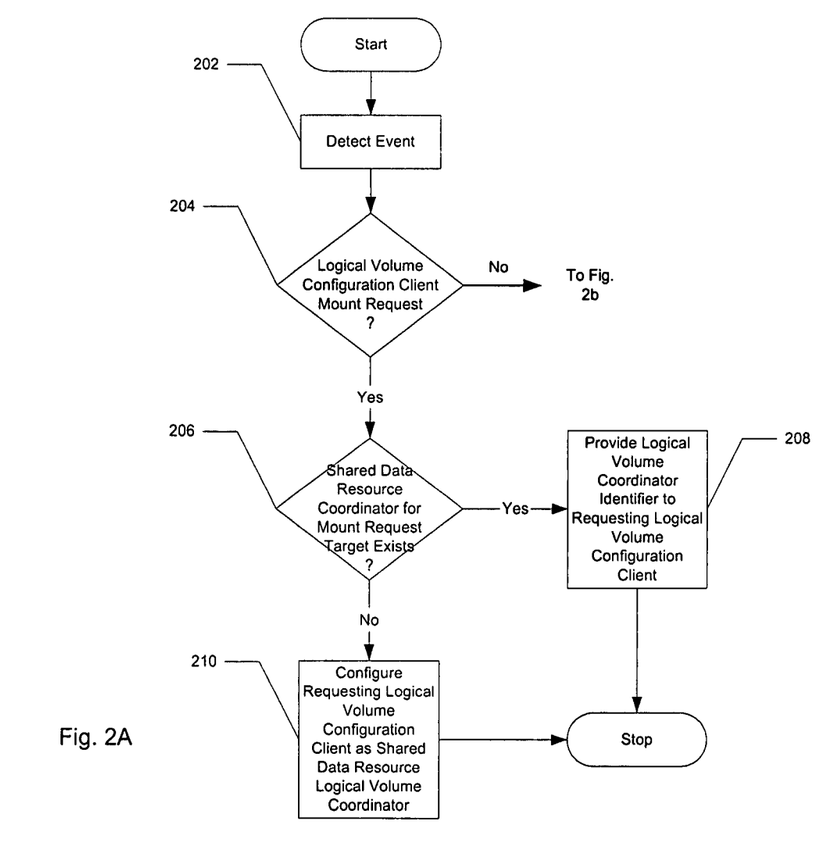
FIG. 2a illustrates a flow diagram of a logical volume mount process according to an embodiment of the present invention.

FIG. 2a illustrates a flow diagram of a logical volume mount process according to an embodiment of the present invention. The logical volume to be mounted in the illustrated process embodiment may be a shared data resource itself or may store one or more shared data resources. In the illustrated process embodiment, an event is initially detected (process block 202). According to one embodiment of the present invention, communications sessions are maintained among nodes associated with a shared data resource (e.g., a node to which shared data resource coordinator functionality has been assigned, storage virtualization server and storage virtualization client nodes). In the described embodiment, detection of an event such as has been illustrated in FIG. 2a includes the detection by a storage virtualization server of a session message from another one of the aforementioned shared data resource associated nodes. Thereafter a determination is made whether or not the detected event indicates or includes a logical volume configuration client mount request (i.e., a request by a logical volume configuration client to mount a logical volume) (process block 204).

Figure 2B:
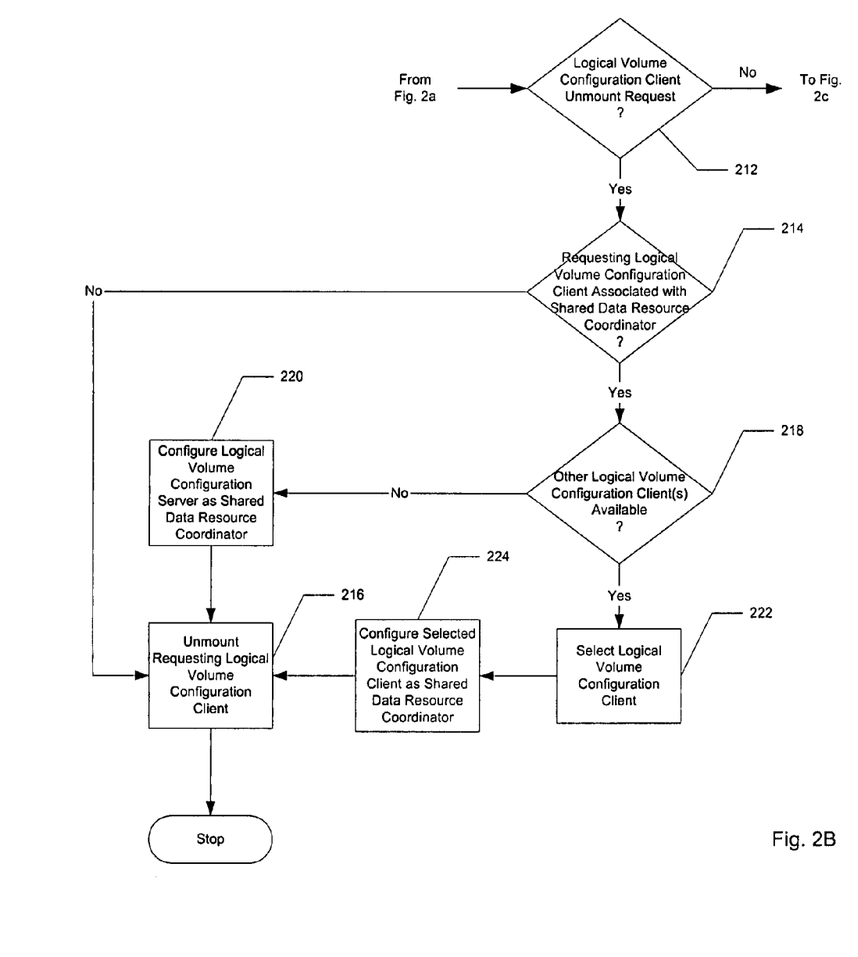
FIG. 2b illustrates a flow diagram of a logical volume unmount process according to an embodiment of the present invention.

If the event detected is not a logical volume configuration client mount request, the illustrated process portion ends, continuing as illustrated in FIG. 2b as shown. If a mount request is detected or received however, another determination is made whether a shared data resource coordinator exists for the logical volume targeted for mounting (process block 206). If a shared data resource coordinator has been established previously, an identifier of the shared data resource coordinator (e.g., a node identifier, world-wide node name, or the like) is provided to the logical volume configuration client issuing the mount request (process block 208) such that all access requests for shared data resources associated with the logical volume to be mounted may be transmitted to and processed by the existing shared data resource coordinator. If no shared data resource coordinator has been previously established however, the mount-requesting logical volume configuration client is configured as the shared data resource coordinator (process block 210) as shown.

Figure 2C:
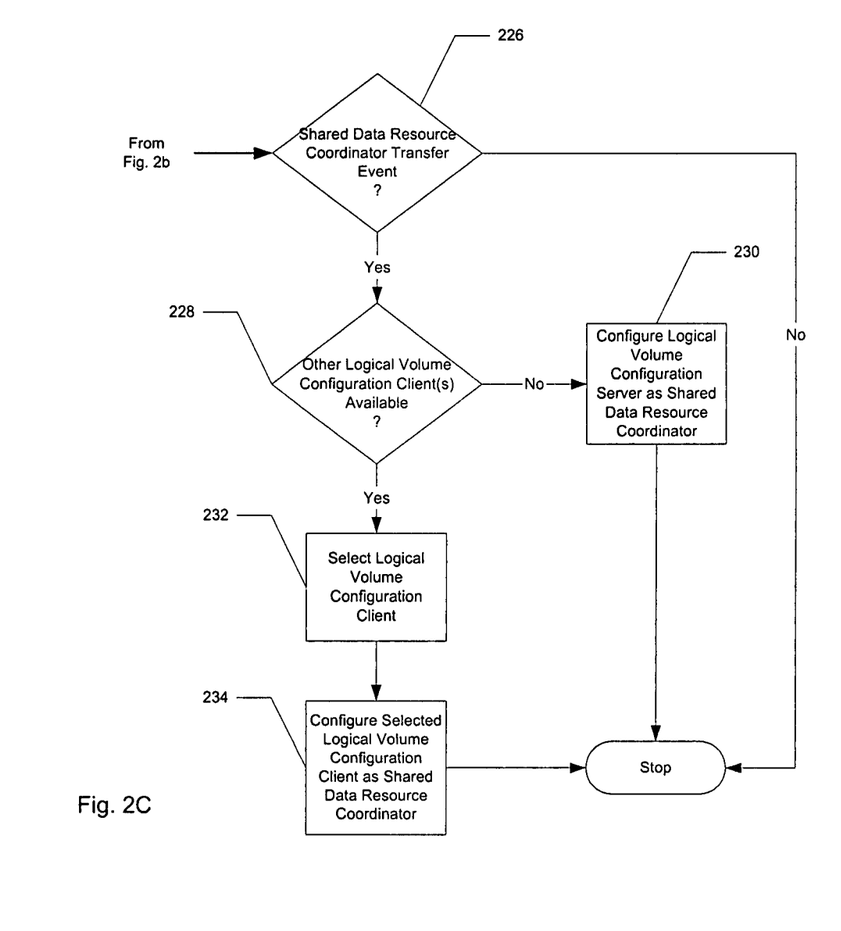
FIG. 2c illustrates a flow diagram of a shared data resource coordinator transfer process according to an embodiment of the present invention.

FIG. 2b illustrates a flow diagram of a logical volume unmount process according to an embodiment of the present invention. In the illustrated process embodiment, a determination is initially made whether the received or detected event indicates or includes a logical volume configuration client unmount request (i.e., a request by a logical volume configuration client to unmount a logical volume) (process block 212). If the event detected is not a logical volume configuration client unmount request, the process portion illustrated in FIG. 2b ends, continuing as illustrated in FIG. 2c as shown. If an unmount request is detected or received however, another determination is made whether the logical volume configuration client making the unmount request is configured as a shared data resource coordinator for a shared data resource on the logical volume to be unmounted (process block 214).

If the logical volume configuration client making the unmount request is not configured as a shared data resource coordinator for the logical volume to be unmounted, the requesting logical volume configuration client is unmounted from the indicated logical volume (process block 216). When a determination is made that the logical volume configuration client making the unmount request is configured as a shared data resource coordinator for a shared data resource on the logical volume to be unmounted however, additional operations are performed to ensure that a shared data resource coordinator is provided. More specifically, a determination is made whether the storage virtualization-employing data processing system in which the logical volume and logical volume configuration client exist includes other logical volume configuration clients to which coordinator duties may be assigned (process block 218).

In an alternative embodiment of the present invention, a shared data resource coordinator need not be associated with a logical volume configuration client or server but may be configured on any of a plurality of nodes within a storage area network/virtualization system. In the illustrated process embodiment of FIG. 2b however, a determination that storage virtualizing data processing system 100 fails to include any other logical volume configuration clients results in a configuration of logical volume configuration server 112 as a shared data resource coordinator (process block 220). If a determination is made that other logical volume configuration clients are present however, one of these existing logical volume configuration clients is selected as further described herein (process block 222) and configured as a shared data resource coordinator (process block 224).

According to one embodiment of the present invention, a node (including a logical volume configuration client node) may only be selected for configuration as a shared data resource coordinator if it is capable of performing one or more coordination duties. More specifically, if a candidate node cannot communicate with one or more other logical volume configuration client nodes associated with a logical volume, it cannot perform accesses or process access requests to a shared data resource (e.g., a shared logical volume or metadata associated therewith) on behalf of such logical volume configuration clients and consequently will not be selected. For example, if a logical volume configuration client is not mounted on a target logical volume completely (e.g., on all physical storage devices which make up the target logical volume) it will not be selected. Similarly, if a logical volume configuration client lacks adequate processing power or bandwidth to process all potential access requests it will not be selected according to another embodiment. In yet another embodiment of the present invention, a logical volume configuration client which fails to access an associated logical volume more frequently than all other associated logical volume configuration client nodes will not be selected as a potential shared data resource coordinator.

While a limited number of criteria have been described herein for selection of a potential shared data resource coordinator, in alternative embodiments any of a number of such criteria may be used. For example, in yet another alternative embodiment, a node will not be considered for configuration as a shared data resource coordinator if the node accesses the shared data resource remotely (e.g., by providing requested I/O operations to another node or element which in turn performs the actual I/O operations on the potential candidate node's behalf).

FIG. 2c illustrates a flow diagram of a shared data resource coordinator transfer process according to an embodiment of the present invention. In the illustrated process embodiment, a determination is initially made whether a previously detected event (process block 202 of FIG. 2a) indicates or includes a shared data resource coordinator transfer request (process block 226). If no shared data resource coordinator transfer event has occurred, no further actions are taken in the illustrated process. The shared data resource coordinator role may be transferred between nodes under a variety of circumstances according to various embodiments of the present invention. For example, a new shared data resource coordinator may be assigned or configured where an existing shared data resource coordinator fails or becomes incapable of performing coordinator functions (e.g., communicating with other nodes, accessing a shared data resource due to unmounting or a loss of connectivity to the disks, or the like), where an existing shared data resource coordinator becomes overloaded and additional coordinators are needed to perform accesses to a shared data resource on behalf of other nodes, and/or where another node may perform coordinator functions more efficiently.

If a shared data resource coordinator transfer event has occurred, another determination is made whether logical volume configuration clients other than those currently configured as shared data resource coordinators exist to which coordinator duties may be assigned (process block 228). If a determination is made that no other logical volume configuration clients exist which are capable of being configured as a shared data resource coordinator, an associated logical volume configuration server is so configured (process block 230). Where alternative logical volume configuration clients are present however, one or more may be selected (process block 232) and configured as a coordinator (process block 234) as shown. While various embodiments of the present invention have been described in which a shared data resource coordinator is assigned or configured for a resource, not all shared data resources require a coordinator. For example, where another coordination or arbitration method is provided to process access requests for a shared logical volume a shared data resource coordinator such as described herein may be unnecessary and therefore not configured.

Figure 3:
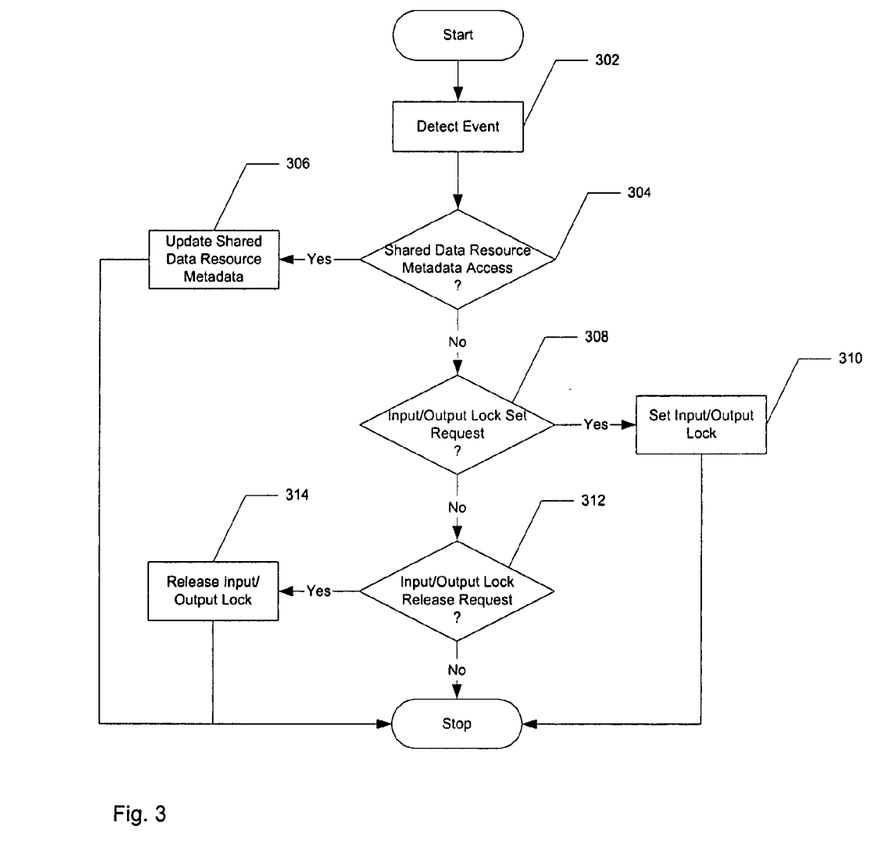
FIG. 3 illustrates a flow diagram of a shared data resource coordinator process for processing access requests to a shared data resource.

FIG. 3 illustrates a flow diagram of a shared data resource coordinator process for processing access requests to a shared data resource. In the illustrated process embodiment, an event is initially detected (process block 302). According to one embodiment of the present invention, communication sessions are maintained between nodes associated with a shared data resource (e.g., a node to which shared data resource coordinator functionality has been assigned, storage virtualization server and storage virtualization client nodes, or the like). In the depicted embodiment of FIG. 3 the illustrated event detection consequently may include the detection by a shared data resource coordinator and/or a storage virtualization server of a session message from another one of the aforementioned nodes associated with the shared data resource. Thereafter, a determination is made whether or not the detected event indicates or includes a request to access shared data resource metadata (process block 304) and if so, the shared data resource metadata is updated (process block 306) as shown. According to one embodiment of the present invention, shared data resource metadata includes a data change object or map indicating which regions of a shared and mirrored logical volume have been previously updated and may require synchronization following a data processing system/node failure, a mirror storage element write failure or snapshot/detached mirror reattach operation.

If the detected event does not indicate a request to modify shared data resource metadata, another determination is made whether the detected event indicates a request to set an input/output (I/O) lock for a shared data resource (process block 308) or to release an existing shared data resource I/O lock (process block 312). Associated I/O locks are then set or released as appropriate (process blocks 310 and 314). According to one embodiment of the present invention, I/O locks are set and released for a shared and mirrored logical volume in a read/writeback mode. The read/writeback mode or synchronization method is used when a system failure and reboot causes a mirrored logical volume to be restarted with multiple mirror storage elements that were active before the failure.

In read/writeback mode, all mirror storage elements of a logical volume are equally likely to contain up-to-date data and may contain the result of different writes that were in process when a system failure occurred. In read/writeback mode, requested read operations are serviced from any mirror storage element with the data which was read then being written to all remaining mirror storage elements to ensure consistency. During read/writeback mode, according to one embodiment, I/O requests to a region of a shared logical volume cause an I/O lock set request or event to be generated for that region within the logical volume, and consequently across each mirror storage element of the logical volume.

If a region of a logical volume is locked when an I/O lock set request is made (e.g., a previous I/O lock set request has been granted to another node and a corresponding I/O lock release request has not yet been made or granted) the I/O lock set request is denied and an associated I/O operation may not be performed. Alternatively, a subsequent I/O lock set request for a "locked" region of a logical volume (e.g., a region for which a previous I/O lock set request has been granted to another node and a corresponding I/O lock release request has not yet been made or granted) may cause the subsequent I/O lock set request to be queued with other such requests so that it may be granted in-order later once previous I/O locks have been set and then released. Once an I/O lock set request is granted (e.g., by a shared data resource coordinator), the requesting node may proceed with an associated I/O operation. After the associated I/O is complete, the requesting node may generate an I/O lock release request or event. In the described embodiment, the use of such I/O locks to a region of a logical volume ensures that only one node may perform I/O operations to any region of the logical volume at a given time.

Figure 4:
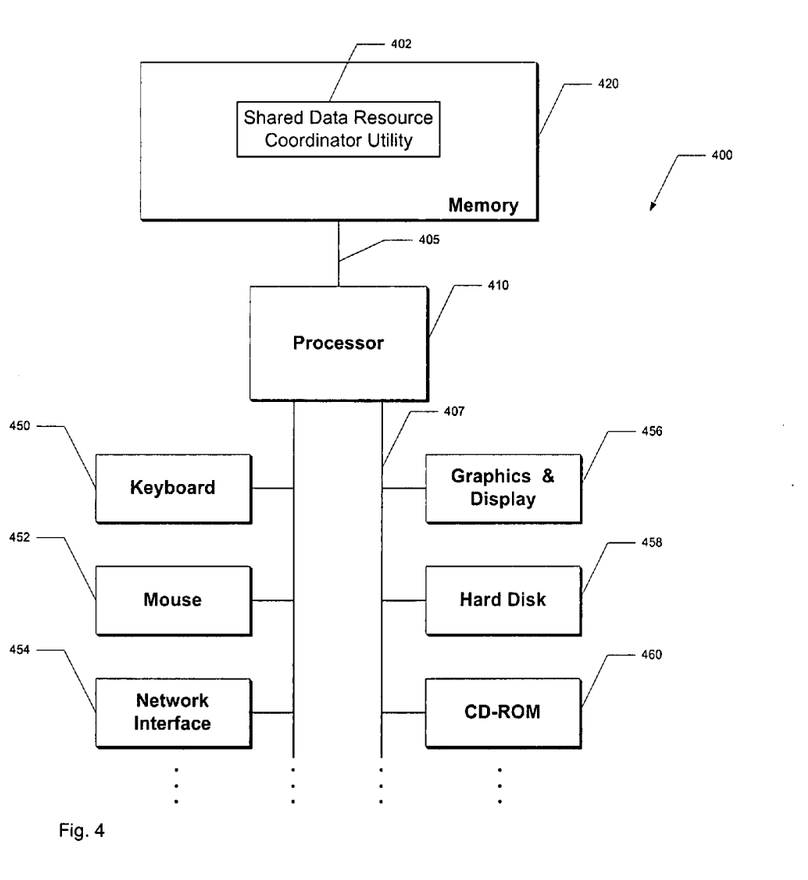
FIG. 4 illustrates a data processing system useable with one or more embodiments of the present invention.

FIG. 4 illustrates a data processing system useable with one or more embodiments of the present invention. Data processing system 400 can be used, for example, to implement one or more nodes of a larger data processing system. Data processing system 400 of the illustrated embodiment includes a processor 410 and a memory 420 coupled together by communications bus 405. Processor 410 can be a single processor or a number of individual processors working together. Memory 420 is typically random access memory (RAM), or some other dynamic storage device, and is capable of storing instructions to be executed by the processor(s), e.g., shared data resource coordinator utility 402. Memory 420 is also used for storing temporary variables or other intermediate data during the execution of instructions by processor 410.

Data processing system 400 of the illustrated also includes devices such as keyboard 450, and mouse 452, network interface 454, graphics & display 456, hard disk 458, and CD-ROM 460, all of which are coupled to processor 410 by communications bus 407. It will be apparent to those having ordinary skill in the art that data processing system 400 can also include numerous elements not shown in the figure, such as additional storage devices, communications devices, input devices, and output devices, as illustrated by the ellipses shown.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Shell, Perl and Tcl/Tk. Shared data resource coordinator utility 402 can be provided to the data processing system via a variety of machine-readable media including electronic media (e.g., flash memory), magnetic storage media (e.g., hard disk 458, a floppy disk, etc.), optical storage media (e.g., CD-ROM 460), and communications media conveying signals encoding the instructions (e.g., via a network coupled to network interface 454).

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
configuring a current coordinator node of a plurality of nodes to update metadata stored on a shared data resource for each of said plurality of nodes, wherein
said plurality of nodes comprise a logical volume configuration server and a plurality of volume configuration clients,
said current coordinator node is configured on a first logical volume configuration client of said plurality of volume configuration clients in response to said first logical volume configuration client mounting said shared data resource,
said logical volume configuration server is configured to provide volume configuration information for a logical volume to said first logical volume configuration client,
said logical volume is associated with said metadata, and
said logical volume configuration server is not said current coordinator node;
detecting a request to unmount said logical volume, wherein said request is made by said current coordinator node;
selecting a next coordinator node from said plurality of volume configuration clients, in response to receiving said request, wherein said next coordinator node is selected to be a second logical volume configuration client of said plurality of volume configuration clients in response to a determination that said second logical volume configuration client is a more appropriate host of coordinator node functionality than others of said plurality of volume configuration clients, wherein
said first logical volume configuration client and said second logical volume configuration client comprise a logical volume configuration client which has generated a greatest number of requests to access said shared data resource, and
said logical volume configuration client is selected as said next coordinator node in response to said logical volume configuration client having generated said greatest number of requests to access said shared data resource; and
configuring said next coordinator node to update said metadata for at least one of said plurality of nodes in response to said selecting.

2. The method of claim 1, wherein said configuring said next coordinator node comprises:
configuring said next coordinator node to process requests to access data indicating which of a plurality of portions of said logical volume has been previously modified.

3. The method of claim 2, wherein
said logical volume comprises a first mirror storage element and a second mirror storage element,
each of said first mirror storage element and said second mirror storage element is configured to store a copy of data to be stored within said logical volume, and
said method further comprises
copying data from said first mirror storage element to said second mirror storage element using said data indicating which of said plurality of portions of said logical volume has been previously modified.

4. The method of claim 1, wherein
said logical volume comprises a shared volume, and
said configuring said next coordinator node comprises
configuring said next coordinator node to process requests to access said logical volume.

5. The method of claim 1, further comprising determining which of the plurality of volume configuration clients is the more appropriate host of the coordinator node functionality, wherein the determining is based upon at least one of: information identifying which of the plurality of volume configuration clients has a minimum amount of bandwidth to implement coordinator node functionality and information identifying which of the plurality of volume configuration clients can access the shared data resource on behalf of other volume configuration clients.

6. A non-transitory machine-readable storage medium having a plurality of instructions embodied therein, wherein said plurality of instructions are executable to:
configure a current coordinator node of a plurality of nodes to update metadata stored on a shared data resource for each of said plurality of nodes, wherein
said plurality of nodes comprise a logical volume configuration server and a plurality of volume configuration clients,
said current coordinator node is configured on a first logical volume configuration client of said plurality of volume configuration clients in response to said first logical volume configuration client mounting said shared data resource,
said logical volume configuration server is configured to provide volume configuration information for a logical volume to said first logical volume configuration client,
said logical volume is associated with said metadata, and
said logical volume configuration server is not said current coordinator node;
detect a request to unmount the logical volume, wherein the request is made by the current coordinator node;
select a next coordinator node from said plurality of volume configuration clients, in response to the request, wherein said next coordinator node is selected to be a second logical volume configuration client of said plurality of volume configuration clients in response to a determination that said second logical volume configuration client is a more appropriate host of coordinator node functionality than others of said plurality of volume configuration clients, wherein
said first logical volume configuration client and said second logical volume configuration client comprise a logical volume configuration client which has generated a greatest number of requests to access said shared data resource, and
said logical volume configuration client is selected as said next coordinator node in response to said logical volume configuration client having generated said greatest number of requests to access said shared data resource; and
configure said next coordinator node to update said metadata for at least one of said plurality of nodes.

7. The non-transitory machine-readable storage medium of claim 6, wherein said plurality of instructions are executable to:
configure said next coordinator node to process requests to access data indicating which of a plurality of portions of said logical volume has been previously modified.

8. The non-transitory machine-readable storage medium of claim 7, wherein
said logical volume comprises a first mirror storage element and a second mirror storage element,
each of said first mirror storage element and said second mirror storage element is configured to store a copy of data to be stored within said logical volume, and said plurality of instructions are executable to:
copy data from said first mirror storage element to said second mirror storage element using said data indicating which of said plurality of portions of said logical volume has been previously modified.

9. A system comprising:
a processor;
a memory coupled to the processor;
a network interface coupled to the processor, wherein
the network interface is configured to be coupled to a network; and program instructions residing in the memory and executable on the processor,
wherein the program instructions are executable by the processor to:
configure a current coordinator node of a plurality of nodes to update metadata stored on a shared data resource for each of said plurality of nodes, wherein
said plurality of nodes comprise a logical volume configuration server and a plurality of volume configuration clients,
said current coordinator node is configured on a first logical volume configuration client of said plurality of volume configuration clients in response to said first logical volume configuration client mounting said shared data resource,
said logical volume configuration server is configured to provide volume configuration information for a logical volume to said first logical volume configuration client,
said logical volume is associated with said metadata, and
said logical volume configuration server is not said current coordinator node;
detect a request to unmount the logical volume, wherein the request is made by the current coordinator node;
select a next coordinator node from said plurality of volume configuration clients, in response to the request, wherein said next coordinator node is selected to be a second logical volume configuration client of said plurality of volume configuration clients in response to a determination that said second logical volume configuration client is a more appropriate host of coordinator node functionality than others of said plurality of volume configuration clients, wherein
said first logical volume configuration client and said second logical volume configuration client comprise a logical volume configuration client which has generated a greatest number of requests to access said shared data resource, and
said logical volume configuration client is selected as said next coordinator node in response to said logical volume configuration client having generated said greatest number of requests to access said shared data resource; and
configure said next coordinator node to update said metadata for at least one of said plurality of nodes.

10. The system of claim 9, wherein said program instructions are further executable by the processor to:
further configure said next coordinator node to process requests to access data indicating which of a plurality of portions of said logical volume has been previously modified.

11. The system of claim 10, wherein
said logical volume comprises a first mirror storage element and a second mirror storage element,
each of said first mirror storage element and said second mirror storage element is configured to store a copy of data to be stored within said logical volume, and
said system is further configured to
copy data from said first mirror storage element to said second mirror storage element using said data indicating which of said plurality of portions of said logical volume has been previously modified.

12. The system to claim 9, wherein
said logical volume comprises a shared volume, and
said program instructions are further executable by the processor to:
further configure said next coordinator node to process requests to access said logical volume.

* * * * *